United States Patent
DeLay et al.

(10) Patent No.: US 10,887,244 B1
(45) Date of Patent: Jan. 5, 2021

(54) METHODS, SYSTEMS AND APPARATUSES FOR OPTIMIZING TIME-TRIGGERED ETHERNET (TTE) NETWORK SCHEDULING BY BIN ALLOCATION, DEMAND PREDICTION AND MACHINE LEARNING

(71) Applicant: HONEYWELL INTERNATIONAL INC., Morris Plains, NJ (US)

(72) Inventors: Benjamin F. DeLay, Cave Creek, AZ (US); Srivatsan Varadarajan, Rockville, MD (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/554,128

(22) Filed: Aug. 28, 2019

(51) Int. Cl.
*H04L 12/875* (2013.01)
*H04L 12/865* (2013.01)

(52) U.S. Cl.
CPC .......... *H04L 47/56* (2013.01); *H04L 47/6275* (2013.01)

(58) Field of Classification Search
CPC .......................... H04L 47/56; H04L 47/6275
See application file for complete search history.

(56) References Cited

U.S. PATENT DOCUMENTS

| | | | |
|---|---|---|---|
| 7,675,919 B2 | 3/2010 | Vestal | |
| 8,185,899 B2 | 5/2012 | Daly et al. | |
| 8,937,865 B1 | 1/2015 | Kumar et al. | |
| 9,369,351 B2 | 6/2016 | Di Pietro et al. | |
| 9,609,660 B2 | 3/2017 | Chaudhuri et al. | |
| 9,762,501 B2 | 9/2017 | Varadarajan et al. | |
| 9,769,075 B2 | 9/2017 | Varadarajan et al. | |
| 2007/0047444 A1 | 3/2007 | Leroy et al. | |
| 2012/0027022 A1* | 2/2012 | Birkedahl | H04L 49/552 370/401 |
| 2016/0142266 A1 | 5/2016 | Carroll et al. | |

(Continued)

FOREIGN PATENT DOCUMENTS

EP 3139547 A1 3/2017

OTHER PUBLICATIONS

Zhao (Improving Worst-Case Latency Analysis for Rate-Constrained Traffic in the Time-Triggered Ethernet Network; IEEE Communications Letters, Vol. 18, No. 11, Nov. 2014) (Year: 2014).*

(Continued)

*Primary Examiner* — Zhensheng Zhang
(74) *Attorney, Agent, or Firm* — Lorenz & Kopf, LLP

(57) ABSTRACT

Methods, systems and apparatuses for scheduling a plurality of Virtual Links (VLs) in a Time-Triggered Ethernet (TTE) network by determining a weight for each of the plurality of VLs, the determined weight being proportional to a demand each of the plurality of VLs will place on the time-triggered ethernet network; generating a plurality of bins whose length in time is harmonic to all the scheduled rates of the plurality of VLs; determining a demand value proportional to how often the bin is expected to be used based upon a green zone of each of the plurality of VLs and the determined weight for each of the plurality of VLs; updating the demand value for each bin within the green zone; sorting the plurality of bins from least demanded to most demanded based upon the updated demand value; and scheduling the sorted plurality of VLs within the sorted plurality of bins.

20 Claims, 6 Drawing Sheets

(56) References Cited

U.S. PATENT DOCUMENTS

2016/0294697 A1* 10/2016 Varadarajan ............ H04L 47/28
2017/0222905 A1    8/2017 Leroux et al.

OTHER PUBLICATIONS

Sheikh, A. AL, et al. "Optimal Design of Virtual Links in AFDX Networks," Real-Time Systems, May 2013, version 1—Feb. 3, 2012.
Pozo, Francisco, et al. Schedule Synthesis for Next Generation Time-Triggered Networks, (2017).
Nayak, Von Naresh Ganesh, et al., "Scheduling & Routing Time-Triggered Traffic in Time-Sensitive Networks," Graduate School of Excellence Advanced Manufacturing Engineering der Universitat Stuttgart, Nov. 8, 2018.
TTTech Computertechnik AG, TTE Plan, TTEthernet/AFDX Network Planning Tool, brochure, 2018.

\* cited by examiner

METHODS, SYSTEMS AND APPARATUSES FOR OPTIMIZING TIME-TRIGGERED ETHERNET (TTE) NETWORK SCHEDULING BY BIN ALLOCATION, DEMAND PREDICTION AND MACHINE LEARNING

CROSS-REFERENCE TO RELATED APPLICATIONS

The subject matter described here is related to the subject matter described in U.S. patent application Ser. No. 16/554,280 entitled "METHODS, SYSTEMS AND APPARATUSES FOR OPTIMIZING THE BIN SELECTION OF A NETWORK SCHEDULING AND CONFIGURATION TOOL (NST) BY BIN ALLOCATION, DEMAND PREDICTION AND MACHINE LEARNING", and U.S. patent application Ser. No. 16/554,210 entitled "METHODS, SYSTEMS AND APPARATUSES FOR OPTIMIZING TIME-TRIGGERED ETHERNET (TTE) NETWORK SCHEDULING BY USING A DIRECTIONAL SEARCH FOR BIN SELECTION", all filed concurrently herewith.

TECHNICAL FIELD

The present disclosure generally relates to methods, systems and apparatuses for scheduling in time-triggered Ethernet (TTE) networks, and more particularly to determining a weight for each of the plurality of Virtual Links (VLs), the determined weight being proportional to a demand each of the plurality of VLs will place on the TTE network.

BACKGROUND

The growing data needs of TTE networks have stressed the implementation of current algorithms, and these algorithms regularly fail to converge on a valid global schedule for proper traffic throughput in the TTE network. The TTE network is based on routing ethernet frames through isolated data tunnels referred to as VLs. The VLs are multicast trees, each tree enabling data transmission between one and only one end of the TTE network to several others ends. When using multiple VLs deployed for exchanging data within and between avionics systems, the multiple VLs are deployed with a reserved amount of bandwidth. The design of the VLs enables data exchanges between partitions located on different modules that require tunneling through VLs in which a dedicated VL is configured for each communication flow. For efficient tunneling, a selection of particular transmission parameters is required that affect the overall timing properties and the bandwidth allocation of the VL, in addition to enabling a path between the source (producer) and the receivers.

To schedule each VL, the scheduling algorithm of the NST sorts the VLs based on transmit rate, size, and latency constraints. For each rate, the tightest-constrained VLs are scheduled first. This approach assumes that rate and latency requirements track closely and inversely, but data sets have since been presented to the algorithm that exhibit many instances of low-rate, low-latency data, violating these basic assumptions. These data sets have been shown to be difficult to schedule with the current algorithmic approaches to time slot selection, and scheduling attempts fail to produce a valid network schedule with all requested VL traffic included.

Hence, there is a need for methods, systems and apparatuses for scheduling in TTE networks by determining a weight for each of the plurality of virtual links in which the determined weight being proportional to the expected bandwidth and latency demand of each of the virtual links in the network.

Other desirable features and characteristics will become apparent from the subsequent detailed description and the appended claims, taken in conjunction with the accompanying drawings and the foregoing technical field and background.

BRIEF SUMMARY

Methods, systems, and apparatuses are provided for scheduling a plurality of VLs) in a TTE network.

In an exemplary embodiment, a method of scheduling a plurality of VLs in a TTE network, each of the plurality of virtual links having a scheduled rate is provided. The method includes: determining a weight for each of the plurality of VLs wherein a determined weight being proportional to a demand each of the plurality of VLs will place on the TTE network; generating a plurality of bins whose length in time is harmonic to all the schedule rates of the plurality of VLs; determining, for each of the plurality of bins, a demand value proportional to how often a bin is expected to be used based upon a green zone of each of the plurality of VLs and the determined weight for each of the plurality of VLs wherein the green zone is a time box within a period of scheduling a VL activity based on available latency-related constraints; updating the demand value for each of the plurality of bins within the green zone of each of the plurality of VLs based upon the weight of each of the plurality of VLs; sorting the plurality of bins from least demanded to most demanded based upon the updated demand value determined for each of the plurality of bins; sorting the plurality of VLs based upon a primary sorting requirement and a secondary sorting requirement, the primary sorting requirement including a highest schedule rate to a lowest schedule rate and the secondary sorting requirement including a smallest green zone to a largest green zone; and scheduling the sorted plurality of VLs within the sorted plurality of bins.

The method includes: duplicating bin sets and scheduling traffic for each rate group in an order from fastest to slowest and performing calculations of demand values at a beginning of a scheduling process over a duplicate set of global bins which represent an entire schedule cycle using a bin demand property on each bin of a global set. The method further includes: processing a list of VLs to determine each VL's weighting factor for updating all of a set of bins within the VL's green zone in order for each bin to the updated demand value by the weighting factor. In addition, the method includes: after calculating a global bin demand, processing each VL to determine a median bin demand value of a set of target bins based on the VL's green zone wherein the median bin demand value is added as a sort determination in the list of VLs in order for each VL of the list with a higher median bin demand value in a set of available bins to be scheduled first. The method includes: when a rate transition occurs in the scheduling algorithm, duplicating a list of scheduled bins, and assigning each bin a maximum demand value of all of the harmonic bins of a global schedule. The method further includes: when the VL is scheduled in a current bin rate group, the VL's demand value is first removed from a global bin set, and a current bin rate group is then sorted primarily by ascending bin demand value and then by descending bin utilization.

In various exemplary embodiments, the method, further includes: when VLs are scheduled into bins, the bin utilization is tracked by the NST in order to re-order the bins for searching and for favoring selection of bins that exhibit the least demand from other VLs thereby searching parts of the global timeline that will satisfy the latency constraints of a current VL, and favor a set of lowest-demand but highest-utilized bins to maximize bin packing efficiency. The available latency related constraints include: producing and consuming host timing and network latency budget constraints.

In another exemplary embodiment, a system for scheduling a plurality of VLs in a TTE network using an NST, each of the plurality of VLs having a scheduled rate is provided. The system includes: the NST configured to: determine a weight for each of the plurality of VLs wherein a determined weight is proportional to a demand each of the plurality of VLs will place on the TTE network; generate a plurality of bins whose length in time is harmonic to all the schedule rates of the plurality of VLs; determine, for each of the plurality of bins, a demand value proportional to how often a bin is expected to be used based upon a green zone of each of the plurality of VLs and the determined weight for each of the plurality of VLs wherein the green zone is a time box within a period of scheduling a VL activity based on available latency-related constraints; update the demand value for each of the plurality of bins within the green zone of each of the plurality of VLs based upon the weight of each of the plurality of VLs; sort the plurality of bins from least demanded to most demanded based upon the updated demand value determined for each of the plurality of bins; sort the plurality of VLs based upon a primary sorting requirement and a secondary sorting requirement, the primary sorting requirement including a highest schedule rate to a lowest schedule rate and the secondary sorting requirement including a smallest green zone to a largest green zone; and schedule the sorted plurality of VLs within the sorted plurality of bins.

In various exemplary embodiments, the NST is further configured to duplicate bin sets and schedule traffic for each rate group in an order from fastest to slowest; perform calculations of demand values at a beginning of a scheduling process over a duplicate set of global bins which represent an entire schedule cycle using a bin demand property on each bin of a global set; process a list of VLs to determine each VL's weighting factor for updating all of a set of bins within the VL's green zone in order for each bin to the updated demand value by the weighting factor. In addition, the NST is further configured to: after calculating a global bin demand, process each VL to determine a median bin demand value of a set of target bins based on the VL's green zone wherein the median bin demand value is added as a sort determination in the list of VLs in order for each VL of the list with a higher median bin demand value in a set of available bins to be scheduled first. The NST is configured to: when a rate transition occurs in the scheduling algorithm, duplicate a list of scheduled bins, and assign each bin a maximum demand value of all of the harmonic bins of a global schedule and when the VL is scheduled in a current bin rate group, remove the VL's demand value from a global bin set and a current bin rate group is then sorted primarily by bin demand value and then by bin utilization.

The NST is further configured to: when VLs are scheduled into bins, track the bin utilization in order to re-order the bins for searching and for favoring selection of bins that exhibit the least demand from other VLs thereby searching parts of the global timeline that will satisfy the latency constraints of a current VL, and favor a set of lowest-demand but highest-utilized bins to maximize bin packing efficiency.

In a final exemplary embodiment, an apparatus including a NST for scheduling a plurality of VLs in a TTE network is provided. The apparatus includes: the NST configured with a processor programmed by a set of instructions to schedule Time-Triggered traffic in a green zone based on timing data available for the VLs, wherein the green zone is a time box within a period of scheduling a VL activity based on available latency-related constraints, by: determining a weight for each of the plurality of VLs wherein a determined weight is proportional to a demand each of the plurality of VLs will place on the TTE network; generating a plurality of bins whose length in time is harmonic to all the schedule rates of the plurality of VLs; determining, for each of the plurality of bins, a demand value proportional to how often a bin is expected to be used based upon the green zone of each of the plurality of VLs and the determined weight for each of the plurality of VLs; updating the demand value for each of the plurality of bins within the green zone of each of the plurality of VLs based upon the weight of each of the plurality of VLs; sorting the plurality of bins from least demanded to most demanded based upon the updated demand value determined for each of the plurality of bins; sorting the plurality of VLs based upon a primary sorting requirement and a secondary sorting requirement, the primary sorting requirement including the highest schedule rate to a lowest schedule rate and the secondary sorting requirement including a smallest green zone to the largest green zone; and scheduling the sorted plurality of VLs within the sorted plurality of bins.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
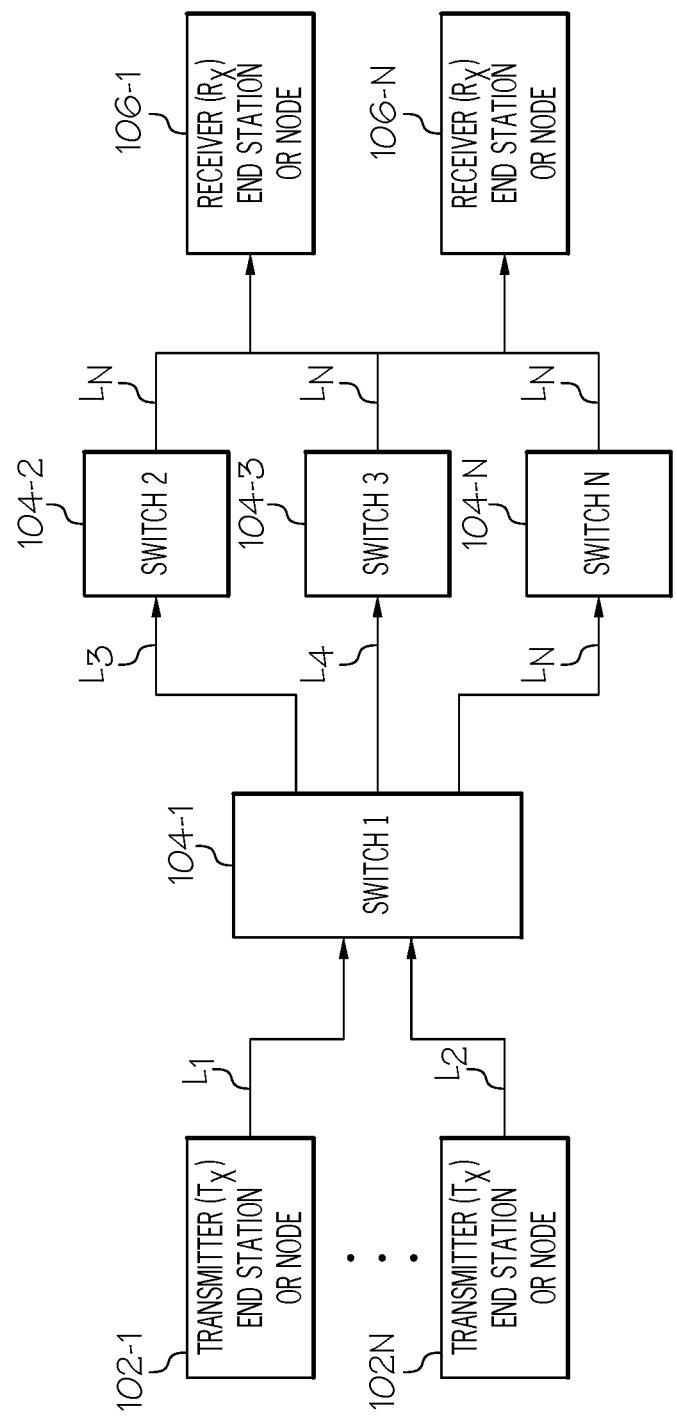
FIG. 1 is a functional block diagram illustrating one embodiment of an exemplary network in accordance with exemplary embodiments.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The embodiments described below enable an improved network scheduling tool (NST) to more efficiently utilize the features and capabilities of the underlying network hardware, such as to provide improved network performance with respect to such measures as latency, interference, etc. For example, the embodiments described below enable improved slot time allocation and improved traffic management. Thus, when implemented by the underlying hardware, the schedule and configuration parameters generated by embodiments of the NST described herein result in improved performance of the network. The various features of the NST described herein can be used together or individually depending on the features and capabilities of the underlying network hardware.

In various exemplary embodiments, the scheduling algorithm of the NST splits a global network timeline into schedulable time slots called "bins" and employs two approaches to placing Time-Triggered (TT) Virtual Link (VL) transport reservations into those bins. The first is a spread-first ("Spread") approach, whereby the algorithm of the NST finds the slots with the most remaining time in which to schedule VL traffic. The second is a pack-first ("Stack") approach that attempts to maximize the packing efficiency of each time slot, stacking non-interfering VLs on top of each other at the same or similar transmit times. The algorithm also features a two-pass search called "Spread_then_Stack" that combines the two by attempting the Stack algorithm if the Spread algorithm fails.

In various exemplary embodiments, the present disclosure describes an optimization that adds a feed-forward prediction capability to the algorithm to enhance the existing scheduling heuristics by calculating a "demand" placed on the bins by a subset of VLs prior to scheduling. The prediction logic analyzes the global set VLs, and a weighted demand value is determined for each VL and applied to a global set of bins.

In various exemplary embodiments, the present disclosure describes an optimization that adds a machine learning approach called deep reinforcement learning to adjust the time slot selection algorithm policy based on many multiple iterations through many data sets using a multi-agent Deep Deterministic Policy Gradient (DDPG) approach.

In various exemplary embodiments, the present disclosure provides improved enhancements to NST for scheduling TTE networks. These approaches have been shown to alleviate scheduling difficulties encountered when scheduling data using the baseline implementation. This allows for a significant performance increase in the existing scheduler logic by analyzing and utilizing additional information in the input data set to inform downstream scheduling decisions, providing system designers additional input to control the behavior of the search algorithms, or by creating a dynamic scheduling algorithm based on novel approaches in machine learning shown to be effective for optimization problems.

In various exemplary embodiments, the present disclosure describes a bi-directional functional search operation of a left-aligned search and a right-aligned search. The initial optimization (i.e., left-aligned search) is an indication of a timeline search orientation to favor bins earlier in the timeline over later in the timeline, and the latter search (right align search) favors bins later in the timeline over earlier bins in the timeline. Hence, the left aligns search effectively searching for available time slots spaces from earlier to later, and the right align search effectively searching for available time slot spaces from later to earlier on the timeline. The default implementation searches from late to early or early bins to late bins as initially configured. This directional search feature allows algorithm by user selection to specify on a per-VL basis the directionality of the time slot search. The spread algorithm still favors the bins with the most available time, so this optimization would most noticeably affect the stack operation. In addition, the directional search can be used to favor time spent in a source versus destination host buffer, which may be favorable, for example, when radiation susceptibility differs between source and destination buffers, or to improve the schedulable actions of an input data set.

In various exemplary embodiments, the present disclosure describes a demand-based scheduling implementation of the NST. Here, the optimization adds a feed-forward capability to enhance the existing scheduling heuristics by examining all VLs to determine the future demand the VL will place on the network schedule during scheduling. The demand of each VL on the bins into which may be scheduled is quantified with a weighting value. The weighting value in a model to multiply the VL payload by the period and divide the result by the green zone size in order to give greater weight to the low-rate, low-latency traffic that presents challenges for current scheduler implementations. The actual calculation of the weight value can vary based on the input data set in future iterations of the invention. The green zone represents the valid scheduling time box within the period of a VL determined using available latency-related constraints, including producing and consuming host timing and network latency budget.

The scheduler operates by creating the smallest set of identically-sized bins whose length in time are harmonic to all the scheduled rates in the target network and allows end-to-end traversal of a full-sized TT frame based on the breadth of the configured network. It then duplicates these bin sets and schedules traffic for each rate group in order from fastest to slowest. The demand calculation is performed at the beginning of the scheduling process over a duplicate set of "global" bins that represent the entire major schedule cycle using a "BinDemand" property on each bin object. The entire list of VLs is processed to determine each VL's weighting factor, then all bins within the VL's green zone have their "BinDemand" values updated by the weighting factor. In an exemplary embodiment, after calculating the global bin demand, then each VL is processed again to determine the median "BinDemand" value of target bins based on the VL's green zone. This median demand is added as a sort determination in the VL list such that VLs with higher median "BinDemand" across its available bins are scheduled first.

When a rate transition occurs in the scheduling algorithm, the list of schedule bins (not the global bin set used to track demand) is duplicated, and each bin gets assigned the maximum demand value of all of its harmonic bins in the global schedule. This allows the maximum future bin demand to be communicated to faster harmonic rates. When a VL is scheduled in the current bin rate group, the VL's demand is first removed from the global bin set and current bin rate group. The current bin rate group is then sorted primarily by "BinDemand" (ascending) and then by bin utilization (descending). As VLs are scheduled into bins, the bin utilization is tracked by the tooling. This enhancement re-orders the bins for the search by favoring selection of bins that exhibit the least demand from other VLs, effectively searching for and finding the "quietest" parts of the global timeline that will satisfy the latency constraints of the current VL, and then favoring the lowest-demand but highest-utilized bins to maximize bin packing efficiency. With the demand-based enhancements incorporated in the baseline tool, the remainder of the scheduling algorithm functions in the same fashion, albeit with results that indicate more success in scheduling large data sets with tight latency requirements, especially for low-rate, low-latency traffic, with future enhancement capability to optimize the weighting function to target other problem data types.

In various exemplary embodiments, the present disclosure describes a machine learning approach called deep reinforcement learning to adjust the time slot selection algorithm policy based on multiple iterations through many data sets using a multi-agent Deep Deterministic Policy Gradient (DDPG) learning algorithm. This approach involves training the DDPG system using an input data set at predetermined points in time (i.e., the beginning of a development program, after major milestone updates, in the event of a failed scheduling attempt, etc.), and small changes to the network definitions that drive a new scheduling operation would utilize the trained network. The Multi-agent DDPG employs four neural networks per agent: an actor, a critic, and their respective target models. The input information to the system includes the same input information available to the scheduler, including VL parameters and the available bins and their attributes. The current state of the network is normalized into a vector of bins with a choice of parameters that describe the current state of the slot, such as the packing efficiency, remaining aggregate demand, or other state variables. The action space for the actor includes the choice of available bins that fall within the current VL's green zone. Reward functions are defined using various quality vectors depending on the goal of the scheduling, including but not limited to the lack of available bins, the packing efficiency of the time lot, and the remaining time in the time slot after scheduling. Reward functions can be balanced based on the needs of a given system, subsystem, or customer.

TT communication sends traffic based on globally synchronized time. The TT packets are sent at predefined times and take priority over all other traffic types in the network. The messages from higher layer protocol can be made TT without modification to the messages themselves. The actual overhead from the protocol that enables TT traffic is sent in special messages. TTE protocol with TT communication is as a result only concerned about when a message is sent not what specific content the message has. The TT traffic is used for applications that require low latency, little jitter, and high deterministic behavior The issued U.S. Pat. No. 9,762,501 B2 to Varadarajan et al. assigned to Honeywell International Inc., Morris Plain, N.J. (US) is incorporated by reference and provides systems and methods for systematic hybrid network scheduling for multiple traffic classes with host timing and phase constraints using a method of scheduling communications in a network that includes scheduling transmission of VLs pertaining to a first traffic class on a global schedule. In addition, to coordinate transmission of the Virtual Links pertaining to the first traffic class across all transmitting end stations on the global schedule. Also the scheduling of transmission of each VL pertaining to a second traffic class on a local schedule of the respective transmitting end station from which each respective VL pertaining to the second traffic class is transmitted where the transmission of each VL pertaining to the second traffic class is coordinated only at the respective end station from which each respective VL pertaining to the second traffic class is transmitted.

FIG. 1 is a block diagram of one embodiment of an exemplary network 100. The network 100 includes a plurality of end stations 102 and 106 (also referred to herein as "nodes") and a plurality of switches 104. As used herein, both switches and end stations can be referred to as nodes. The node 102 is designated as a transmission node and nodes 106-1 . . . 106-N are designated as reception nodes to which a transmitted message from end station (or node 102) is directed. As used herein, a 'Virtual Link (VL)' defines traffic flow from a single transmitting end station (or node 102) to one or more reception nodes 106. For example, a VL may refer to a VL as defined in ARINC 664 part 7. In addition, as used herein, a 'network plane' refers to a disjoint or distinct path from a single transmitting port in a transmitting node 102 to the one or more reception nodes 106 of the Virtual Link. Since all paths in FIG. 1 from the transmitting node 102 to the reception nodes 106-N include switch 104-1, FIG. 1 depicts only a single network plane. Although FIG. 1 only depicts a single network plane for purposes of explanation, it is to be understood that in other embodiments, multiple network planes can be included in network 100 to provide data path redundancy.

The network 100 can be implemented using suitable hardware and protocols which can be configured to support one or more of the functions described herein. For example, for purposes of explanation, the embodiments described herein are implemented using the TTE protocol and compatible hardware as defined in the SAE AS6802 standard. However, it is to be understood that other hardware and protocols can be used in other embodiments. For example, other exemplary network implementations include, but are not limited to, ethernet-based networks including Avionics Full-Duplex Switched (AFDX) Ethernet defined in the ARINC 664 Part 7 standard and non-Ethernet based store and forward networks. As used herein, the ethernet refers to the family of protocols defined in the IEEE 802.3 standard. In addition, it is to be understood that in some embodiments, multiple network protocols can be used together. For example, in some embodiments, a Network Scheduling and Configuration Tool (referred to herein as NST) is configured to enable scheduling a TTE schedule on top of an already existing AFDX schedule, thereby integrating or combine the schedules.

The NST is used to schedule transmission of messages (also referred to herein as frames) through the network 100 as well as determine other configuration parameters for operation of the network 100. The NST need not be one of the end stations 102, 106 or switches 104 in network 100.

Figure 2:
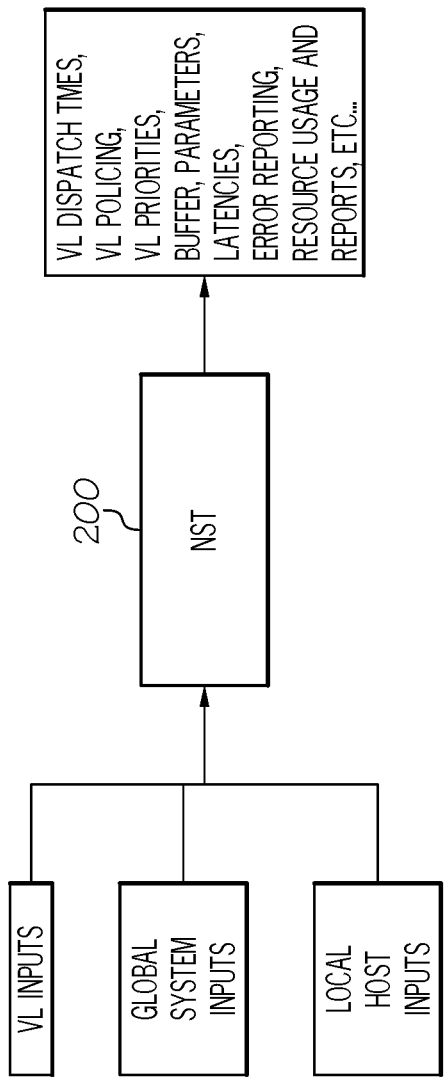
FIG. 2 is a functional block diagram illustrating the use of embodiments of the network scheduling and configuration tool (NST) in accordance with exemplary embodiments.

FIG. 2 depicts exemplary inputs for use by embodiments of the NST 200 and exemplary schedule and configuration parameters output by embodiments of the NST 200. In particular, the exemplary inputs include VL inputs, global system inputs, and local host inputs. The VL inputs for each VL can include the VL identification number, the source network interface card (NIC) (i.e., end stations 102 and 106), the set of reception nodes, routing information, payload size, traffic class, transmit rate, and schedule type of a fast pass or a normal pass scheduling. The fast pass scheduling, also called sub-period scheduling, attempts to schedule a VL transmission after the producer has written the VL into the egress buffer and before the earliest consumer expects to read the VL from the ingress buffer, guaranteeing a network latency less than the period of the VL. The normal pass scheduling, also called super-period scheduling, attempts to schedule a VL transmission after the latest consumer has read the VL from the ingress buffer and before the producer expects to produce a new sample of the VL, guaranteeing a network latency greater than the period of the VL.

The global system inputs can include information regarding synchronization flows between timing masters and compression masters as defined in SAE AS602, and system configuration constants (e.g., precision constant, inter-frame gap (IFG), etc.). The local host inputs can include producer or transmitting node write frame rate, producer time frame offset definition, consumer or reception node read frame rate, consumer time frame offset definition, producer buffer and consumer buffer models (e.g., single transmit buffer, VL queue, direct memory access (DMA), First-in-First-out, etc.) Details regarding exemplary local host inputs are described in more detail below.

The exemplary output scheduling and configuration parameters can include VL dispatch times, VL policing parameters, VL priorities, buffer parameters, latencies, error reporting, resource usage, and reports, etc. For example, the NST 200 can calculate the schedule for VL dispatch times and arrival windows based on message rates and timing constraints. Additionally, the NST 200 can set bandwidth allocation gap (BAG) for bandwidth policing per ARINC 664, policing (jitter) values, assign VL priorities based on rates, determine buffer types and size allocations in end stations and switches, determine resource usage and reports (such as, but not limited to, link utilizations, time slots spare efficiency, buffer utilization, etc.), and provide error and warning reports (such as, but not limited to schedulable actions, buffer overruns, etc.) In addition, the NST 200 can determine end-to-end data latencies and jitter between end stations and provide timing reports for a global timeline and a local timeline for every switch and end station dispatch port. Additional details regarding the schedule and configuration parameters output by the NST 200 are described in more detail below.

Figure 3:
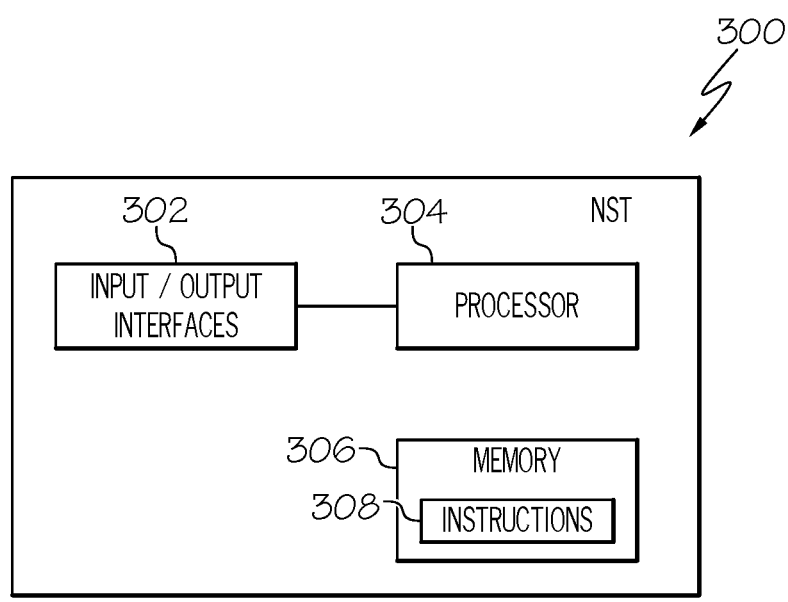
FIG. 3 is a functional block diagram illustrating components of an exemplary NST in accordance with exemplary embodiments.

FIG. 3 illustrates a processing unit, memory, and interface of an exemplary NST in accordance with an embodiment. The NST 300 includes an input/output interface 302, a processing unit 304, and a memory 306. Network scheduling instructions 308 are stored in the memory 306. The processing unit 304 includes or functions with software programs, firmware or other computer-readable instructions (e.g., network scheduling instructions 308) for carrying out various methods, process tasks, calculations, and control functions, used in performing the functions described herein, such as scheduling the multiple classes of frames.

These instructions are typically stored on any appropriate computer-readable medium used for storage of computer-readable instructions or data structures. The computer-readable medium can be implemented as any available media that can be accessed by a general-purpose or special-purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read-Only Memory (ROM), Electrically Erasable Programmable ROM (EEPROM), flash memory, Solid State Drives (SSD) etc.

By executing the network scheduling instructions 308, the processing unit 304 computes network configuration and scheduling tables which are output via the input/output interface 302. The network scheduling instructions 308 are configured to cause the processing unit 304 to implement some or all of the techniques described herein to compute the configuration and schedule tables. The configuration and schedule tables can be loaded into the various nodes (e.g., end stations and switches) of the network for managing the frames that flow through the network. Hence, the NST 300 need not be implemented as a node in the network.

For example, the configuration and scheduling tables allow both Rate Constrained (RC) and Time-Triggered (TT) scheduling parameters of the AS6802 and the ARINC 664 part 7 protocols. That is, a controlled traffic frame arriving at an input port of a switch, for example, maybe transmitted from a dispatch/output port of the switch using the TT scheduling protocol on some output ports and the RC scheduling protocol on other ports, regardless of how the arriving frame was classified on arrival at the input port. In other words, the frame may arrive at the input port as a TT or RC frame. Additionally, the pattern used to determine the class of an arriving frame is configurable. For example, the same frame may be classified differently in different network units. That is, the same frame may be classified differently at a Tx ES than it is at a switch or a receiving end station (Rx ES). Indeed, different physical links in a VL routing tree can be configured to handle the same frame using different traffic classes. The NST configuration may ensure the desired performance for the TT and RC classes for critical traffic. In addition, the NST 300 accommodates Best-Effort (BE) traffic, which typically is used for non-critical traffic, by allowing a network medium to be shared with safety-relevant traffic flows. The traffic classes supported by the NST are discussed in more detail below.

Multi Rate, Multi Criticality Traffic Scheduling

The NST 300 supports multiple classes of messages. In some embodiments, the traffic class for each respective message or frame is derived from or is a function of the addressing scheme. That is, the traffic class can be based on the VL identification (ID) or destination address. In some embodiments, the NST 300 supports the simultaneous scheduling and configuration of a TT message class, an RC message class, and a BE message class that are implemented by the underlying network hardware.

TTE integrates traffic of different time-criticality levels into one physical network. The three traffic classes in TTE corresponding to the time-criticality levels. The classes, ordered by decreasing priority of the Time-Triggered (TT), Rate-Constrained (RC) and Best-Effort (BE) traffic. A so-called temporal firewall or partition is employed for separation of the traffic. The TT messages are sent over the network 100 at predefined times and have a higher priority than RC and BE message types. The occurrence, temporal delay, and precision of TT messages are predefined and guaranteed. The messages have an as little delay on the network as possible, and their temporal precision is as accurate as needed based on system configuration. For example, TT messages are tightly coupled to a global timeline or schedule. As used herein, the global timeline refers to a system-wide clock or notion of time, whereas a local timeline refers to the local time maintained by each node. Thus, the dispatch of TT frames, which are tightly coupled, are tied to the global timeline through each transmitting node and switch. Additionally, as used herein, the term 'tightly coupled' means that the dispatch times for the transmitting node and switches between the transmitting node and reception nodes are tied to a global timeline. Additionally, it is to be understood that the terms 'timeline' and 'schedule' can be used interchangeably herein.

The RC messages can be used for applications with less strict determinism and real-time requirements than TT messages. The RC messages are guaranteed bandwidth that is predefined for each application with delays and temporal deviations that have pre-defined limits. Asynchronous traffic falls within this class. The bandwidth, i.e., payload bytes per period/rate, is guaranteed with a bounded delay/latency to arrive at the receiver and traffic is not tightly coupled to the global timeline. Thus, in contrast to TT messages, the dispatch times of RC frames, which are not tightly coupled, are not tied to the global timeline but have a bounded window for delivery of the frame to the reception nodes.

The BE messages are transported through the network according to conventional Ethernet policy. That is, BE messages are not guaranteed bandwidth, transmit times, limits on maximum delay, or whether the BE messages arrive at the receiver. Essentially, BE messages use the remaining bandwidth of the network after accounting for TT and RC messages and have lower priority than the other two classes of messages.

In some embodiments, the RC messages (also referred to herein as RC frames) satisfy the ARINC specification 664 part 7. The RC frames are queued at dispatch ports (e.g., output ports) in transmitting end stations (TxES) (e.g., node 102) and/or in switches (104-1 . . . 104-N). The RC frames are transmitted according to a priority found in a configuration table computed by the NST 300. In some embodiments, up to eight priority levels are supported by the NST 300.

The RC frames may be policed on arrival at input ports in a switch. For example, the frames can be policed to enforce either rate control in packets per second or bandwidth enforcement in bytes per second. For example, in some embodiments, a token-bucket configured with period and jitter bounds are used. Token-buckets are known to one of skill in the art and, thus, are not described in more detail herein. In some embodiments, the switches are configured to support a fixed number of policing accounts (e.g., each VL being policed is a policing account). For example, in implementations involving AFDX, each VL is monitored at an input port to determine if the number of frames per period complies with the BAG.

The TT messages (also referred to herein as TT frames) are transmitted with a period and offset found in a schedule configuration table with respect to a global timeline. In some embodiments, multiple configurable periods having different respective values can be supported. For example, in some embodiments, up to 8 different periods (rates) for TT messages are supported. In such embodiments, the specific value for each of the 8 periods is configurable. Alternatively, the specific values for more than 8 periods may also be configurable.

Scheduled Rate Constrained Traffic Class

In addition to the traffic classes discussed above, a scheduled rate constrained (SCHRC) "logical" traffic class is created by the NST 300 using TT and RC mechanisms supported by the network hardware, in some embodiments. That is, in calculating the schedule and configuration tables, the NST 300 accounts for SCHRC frames. Handling or scheduling of an SCHRC frame can be considered a hybrid between handling a TT frame and handling a pure RC frame. In particular, whereas TT frames are scheduled on a global timeline, SCHRC frames are scheduled on a local timeline of the respective Tx ES, where the local timeline need not be tied to the global timeline. For example, the same rates/period allowed for TT traffic schedules are also allowed for SCHRC traffic schedules. Additionally, SCHRC VL frames mimic TT VL frames when being scheduled and dispatched from a Tx ES. That is, the SCHRC frames have the same priority as a TT frame when scheduled for dispatch from a Tx ES. However, SCHRC VL frames flow through the $1^{st}$, $2^{nd}$, $3^{rd}$, etc. hop switches to the corresponding Rx ES as an RC frame with lower priority than a TT frame.

Configuration Paradigms

In some embodiments, the routing tables created by the NST 300 configure only the first switch hop to enforce RC BAG/Jitter policies on arrival at the input port. Enforcement of the BAG/jitter policies is disabled at subsequent second hop switches, third hop switches, etc., in such embodiments. The NST 300 can disable BAG/jitter policies for subsequent switches based on the knowledge that the switches are high integrity and fail-passive in some embodiments. Hence, the protection provided by the first hop is sufficient for such implementations.

Thus, in the first configuration option, the TT VL is configured as a TT class of traffic at the dispatch port of the transmitter end station (Tx ES) 102 with the reserve media option enabled and a shuffle time penalty not assumed. Similarly, at each of the switches 104-1 . . . 104-4, the TT VL is configured as a TT class of traffic at the dispatch port of the switches 104 with the reserve media option enabled and a shuffle time penalty not assumed. Thus, the shuffle penalty is not assumed at each of the switches 104. At the input ports of the first switch hop 104-1, the TT VL is configured as a TT class of traffic and an arrival policing window (e.g., the earliest time of arrival and latest time of arrival) is enforced.

At the input ports of the subsequent switch hops (e.g., switch 104-2, 104-3, and 104-N), the TT VL is configured as RC traffic having the highest available RC class priority (e.g., RC6). The subsequent switches 104-2, 104-3, and 104-N are not configured to enforce BAG or jitter policies. At the input ports of the corresponding receiver end stations (Rx ES) (e.g., Rx ES 106-1 . . . 106-N), the TT VL is configured as a TT class of traffic, and each corresponding Rx ES is configured to perform TT redundancy management.

Finally, the NST 300 configures the switch routing tables for routing each TT VL from an input port to one or more output/dispatch ports at every switch between the transmitter end stations (Tx ES) and the Rx ESs, for one or more network planes, using a statically configured path. That is, the same path is used for each frame of the same VL. In some embodiments, the statically configured path is determined using the shortest path algorithm or based on the path having the fewest number of hops. For example, in some embodiments, a Floyd-Warshall algorithm known to one of skill in the art is used.

Bin Allocation and Directional Search

Figure 4A:
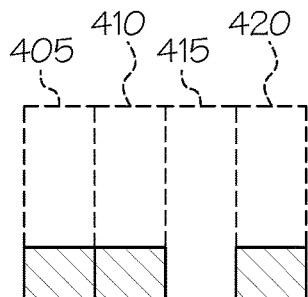
FIGS. 4A, 4B and 4C is a functional bin diagram illustrating the directional search of the NST in accordance with exemplary embodiments.
Figure 4B:
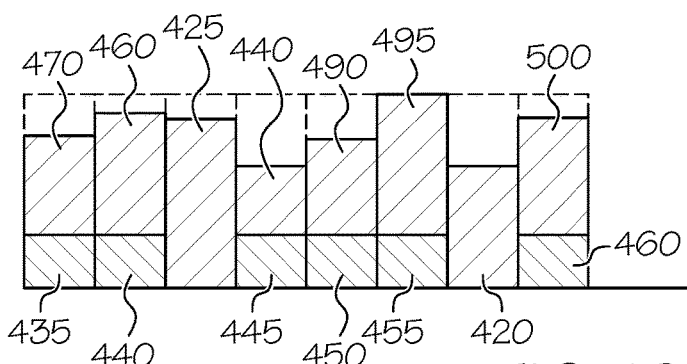
Figure 4C:
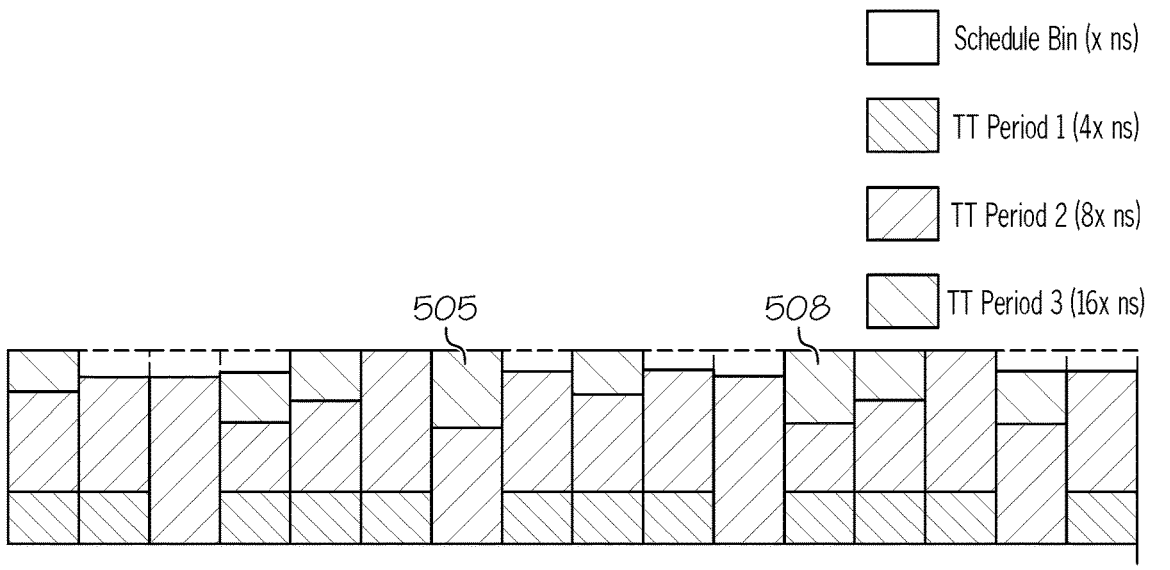

FIGS. 4A to 4C, illustrate the directional search which follows a direction from left (i.e., Bin 405) to the right (i.e., Bin 420) or vice versa, in accordance with an embodiment. In the directional search, the scheduling algorithm of the NST splits a global network timeline into schedulable time slots called "bins" and employs two steps to placing Time-Triggered (TT) VL transport reservations into those bins. The directional search employs the first step of a spread-first ("Spread") operation where the algorithm of the NST finds the slots with the most remaining time in which to schedule VL traffic in either the left to right or right to left direction. The second step is a pack-first ("Stack") approach that attempts to maximize the packing efficiency of each time slot, stacking non-interfering VLs on top of each other at the same or similar transmit times. The algorithm also features a two-pass search called "Spread_then_Stack" that combines the two by attempting the Stack algorithm if the spreading algorithm fails. The input data can also specify the spread first search from left to right or a right to left direction. The directional search of the spread first operation requires or may require multiple passes in either direction by the NST based on each different user input. The size (duration) of each bin corresponds to the smallest harmonic period allowing for full network traversal of a time-triggered traffic packet in the network.

This is also used to determine an initial bin collection size for sending the VL data by the NST. In one exemplary embodiment, the VL is placed into the first bin where it "fits" (there is time in the bin to place next to VLs in a serial fashion and/or the VL can be placed on a non-interfering path with all other VLs in the bin) and the bin utilization is updated. VLs are sorted by (primarily—there are also detailed "tie-breakers" in the sort): Rate (descending), Green zone size (ascending), and Network traversal duration (descending). VLs are subdivided into common-rate groups. For the first-rate group, a set of bins is created using the bin size established previously that occupies the full period of the traffic to be scheduled (i.e., if the bin size is 2500 ns and the highest-rate group consists of 4 kHz traffic, there would be 100 bins in the bin set). For subsequent rate groups, the existing set of bins is cloned until the next harmonic period is populated with the appropriate number of bins.

The NST 300 schedules TT traffic within a timeframe referred to herein as the green zone. The NST 300 calculates the green zone based on the timing information available about the producing host of transmitter end station (e.g., Tx ES 102) and all consuming hosts (e.g., switches 104 and Rx ES 106) for a specified VL. The green zone specifies the constraints to the NST to schedule VLs to coordinate phases on the global timeline between different hosts, such as between producer and consumer hosts of a VL, especially without overriding buffers on end stations. The green zone also specifies the "valid" time on the timeline within which the NST must find the respective schedule for the VL. Hence, the green zone takes into account the phase relationship between the producing host and the consuming hosts. In particular, the green zone is used to make sure that a frame arrives at the time the consumer needs it. For example, the green zone is used to ensure that a frame scheduled after a producing host has the frame ready to transmit and that the frame is received by the consuming host is ready to receive it.

The network bin size is established based on the smallest harmonic to all time-triggered traffic rates supported in the network that allows the complete end to end traversal of one maximum-sized packet the full breadth of the network. The VLs are known and are parsed. The green zone is calculated based on the VL rate, producer/consumer timing information, and the delivery heuristic (i.e., normal/fast pass). All VLs are known and parsed. Bins within the VL's green zone based on the scheduling heuristic (spread first sorts bins ascending by bin utilization) and secondarily by the directional search attribute provided with the VL.

The directional scheduling process for a frame period will either search from the left to right or right to left and identify the least full bin. In addition, it should be noted that the use of the terms "left" and "right" are relative to the green zone. That is, the green zone is normalized with respect to the packet period, such that the "beginning" of a green zone may occur later in the packet period than the "end" of the packet period. So that a left-aligned search will start at the beginning of a green zone and proceed, bin by bin, to the end, even if the green zone "wraps" at the end of the packet period. In this case, Bin 425 and then Bin 420 and then fill the subsequent bins prioritized on space available and VL data. Hence, in a TT period 1 (4× ns), Bins 435, 440, 445, 450, 455, and 460 will be filled. In a next pass, in a left to the right direction, the left-most empty bin will be filled (i.e., bin 425) and then the next leftmost empty bin (i.e., Bin 430). Subsequently, in a next pass, Bin 495 (the now most empty bin on the left) will be filled followed by bin 500. After which bin 470 and then bin 450. In this way, the leftmost empty bin is first filled on each pass, and then the next most empty bin in a left to the right direction.

In FIG. 4C, for the TT period 3, (16× ns), in a left to the right direction, the left-most empty bin 505 will be filled and the then next most empty bin 508 until all available bin space is used.

Demand Prediction

Figure 5:
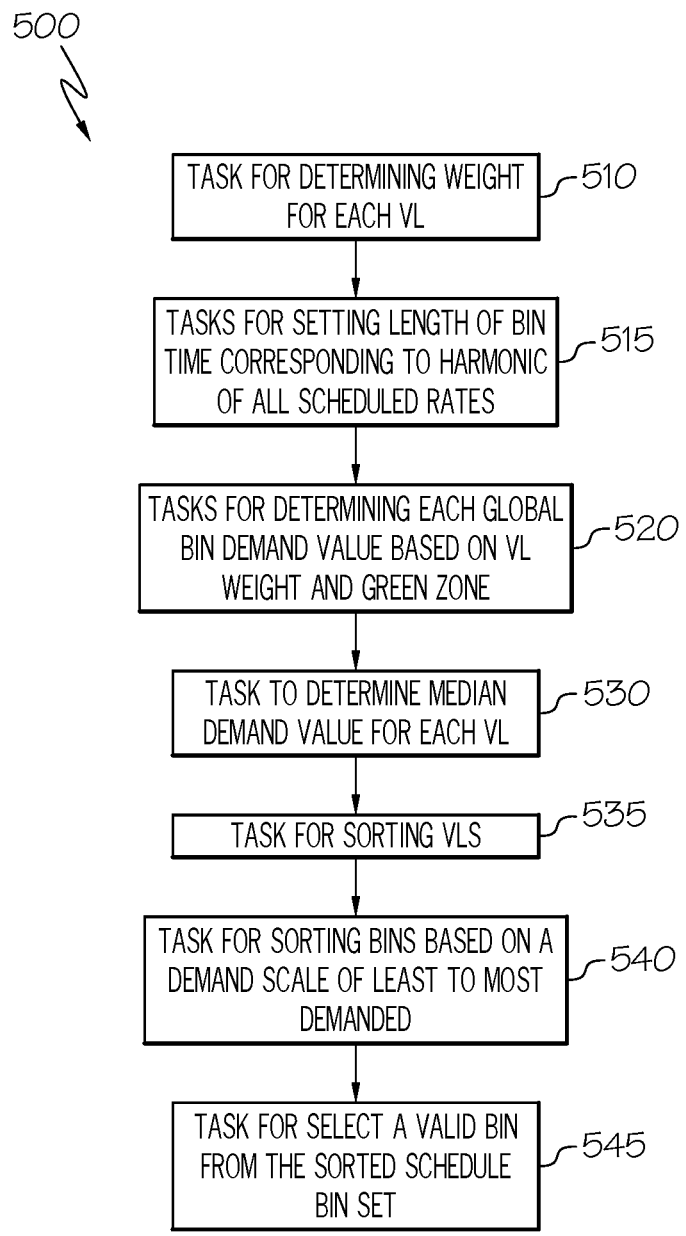
FIG. 5 is a flowchart illustrating a demand prediction method that may be performed by the NST in accordance with exemplary embodiments.

FIG. 5 is an exemplary flowchart 500 that illustrates the demand prediction of the NST, in accordance with an embodiment. The process of demand prediction and scheduling is based on the network bin size established in the smallest period harmonic to all time-triggered traffic rates supported in the network which in turn allows the complete end-to-end traversal of one maximum-sized packet the full breadth of the network. The global demand bin set consists of a set of bins that occupy the lowest supported time-triggered traffic rate (typically 1 Hz).

This approach provides a feed-forward prediction capability to the algorithm to enhance the existing scheduling heuristics by calculating a "demand" placed on a specific bin by a subset of VLs prior to scheduling. The prediction logic analyzes the global set VLs, and a weighted demand value is determined for each VL and applied to a global set of bins. This demand algorithm then favors the network time slot with the lowest-valued demand that is also the highest-utilized bin. The selection of the weighting calculation for VLs must be configured based on knowledge of the input data set to direct the algorithm appropriately, thus the approach presents flexibility to the NST by allowing the adjustment of the weighting factor to deal with newly identified sets of problem data.

Next, all VLs are known and parsed; and a weight factor for each VL is calculated based on VL attributes (size, rate, timing information, source/destination pairs–data set/project-specific factors for weighting). The green zone is calculated based on VL rate, producer and consumer timing information, and delivery heuristic (normal/fast pass). The weight factor for each VL is added to all bins within the VL's green zone to establish the bin demand. The VLs are sorted by (primarily—there are also detailed "tie-breakers" in the sort) as in the case of the directional sort of rate (descending), green zone size (ascending), and network traversal duration (descending).

As in the case of the directional sort, the VLs are subdivided into common-rate groups. For the first rate group, a set of bins is created using the bin size established previously that occupies the full period of the traffic to be scheduled (i.e., if the bin size is 2500 ns and the highest-rate group consists of 4 kHz traffic, there would be 100 bins in the bin set). For subsequent rate groups, the existing set of bins is cloned until the next harmonic period is populated with the appropriate number of bins. When new bin sets are created, the bin demand for each bin is set to the maximum demand value of all harmonic bins in the global demand bin set.

Next, the VLs are scheduled in sorted order per rate group: Bins within the VL's green zone are sorted by demand (descending) and then (optionally) by utilization (descending) (this is the "stacking" process). The VL is placed into the first bin where it "fits" (there is a time in the bin to place next to VLs in a serial fashion and/or the VL can be placed on a non-interfering path with all other VLs in the bin), and the bin utilization is updated. Once the VL has been scheduled, its weight factor is removed from the demand values of all bins in its green zone.

As described in FIG. 5, the method of scheduling a plurality of VLs in a time-triggered ethernet network, each of the plurality of VLs having a scheduled rate is illustrated. At task 510, a weight for each VL is determined. The weight determination can be pre-selected to be proportional to a demand placed on scheduling bins by the VL. If the demand is greater than the proportional weight would be greater and likewise, if the demand is less than the proportional weight is less. At task 515, each bin in the set has the length in time which is harmonic to all the schedule rates in the set of VLs. At task 520, a demand value for each bin is calculated by adding the weight for each VL that is processed to each bin within the VL's green zone. Also, calculations of demand values are performed by the NST at the beginning of a scheduling process over a duplicate set of global bins which represent an entire schedule cycle using a bin demand property on each bin of the global set. In various exemplary embodiments, as the schedule bin sets are duplicated, each schedule bin receives the bin demand property value of the maximum demand of all harmonic bins from the global bin set, and traffic is scheduled for each rate group in order from fastest to slowest.

At task 530, the demand values calculated by algorithms of the NST for all bins in each VL's green zone are examined to determine the median demand value of all bins in the VL's green zone. In an exemplary embodiment, after calculating the demand values for the global bin set, each VL is processed to determine a median bin demand value of a set of target bins based on the VL's green zone, and the median bin demand value is added as a sort determination in the list of VLs in order for each VL of the list with a higher median bin demand value in a set of available bins to be scheduled first.

At task 535, the set of VLs is sorted based on primary and secondary sorting requirements from a primary sorting from the highest schedule rate to the lowest schedule rate and a secondary sorting from a smallest green zone to a largest green zone. Optionally, the VLs are also sorted from a highest to lowest median demand value. The set of VLs is then parsed in order for scheduling.

At task 540, the set of bins in the VL's green zone is sorted based on a demand scale from least to most demanded. Other attributes, such as user types can also be considered. Further, when a rate transition occurs in the scheduling algorithm, a duplicated list of scheduled bins is created, and each bin is assigned a maximum demand value of all of the harmonic bins of the global bin set. Also, when the VL is scheduled in the current schedule bin rate group, the VL's demand value is first removed from the global bin set, and the current schedule bin rate group is then sorted primarily by bin demand value and then by bin utilization.

When VLs are scheduled into bins, the bin utilization is tracked by the NST in order to re-order the bins for searching and for favoring the selection of bins that exhibit the most efficient packing. This enables searching the quietest parts of the global timeline that will satisfy the latency constraints of the current VL (via the primary ascending demand sort) while favoring the highest-utilized bins to maximize bin packing efficiency. The demand-based enhancements are incorporated in the NST, and the remainder of the scheduling algorithm functions in the same manner in scheduling large data sets with latency requirements of low-rate, low-latency traffic. At task 545, the first valid bin into which the VL "fits" is selected, and the VL's weight factor is removed from all global bins in the VL's green zone.

Multi-Agent Deep Deterministic Policy Gradients (DDPG)

Figure 6:
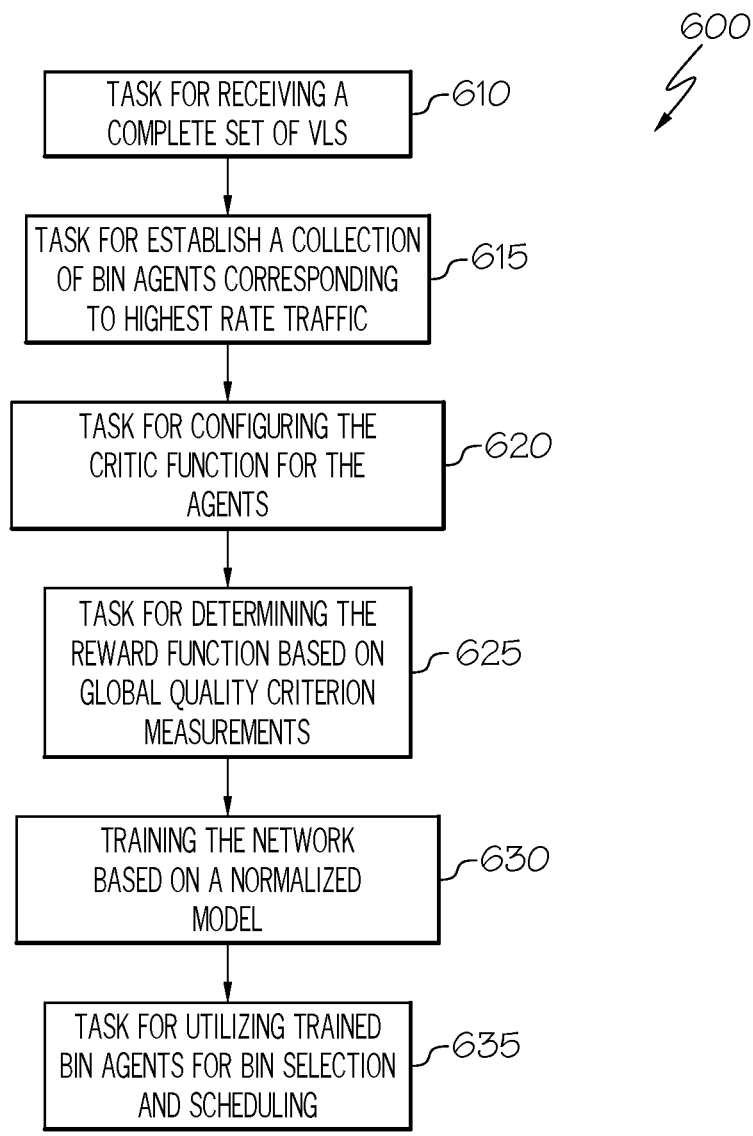
FIG. 6 is a flowchart illustrating a bin selection optimization method that may be performed by the NST in accordance with exemplary embodiments.

FIG. 6 is a flowchart 600 of optimizing the bin selection of the NST by using a neural network, in accordance with an embodiment. This bin selection optimization process uses machine learning through deep reinforcement learning to adjust the time slot selection algorithm policy based on multiple iterations through multiple data sets using a Multi-Agent Deep Deterministic Policy Gradient (MADDPG) approach. The MADDPG application employs or relies on two neural networks per agent: an actor and its target model, and two global neural networks: a centralized critic and its respective target model. This MADDPG application treats each bin as an independent agent. The input information to the NST can include the same input information available in the past to the scheduler, including VL parameters and the available bins and respective attributes. The current state of the network is normalized into a vector of bins with a choice of parameters that describe the current state of the bins, such as the packing efficiency, remaining aggregate demand, or other state variables. The action space for the actor includes the choice of available bins that fall within the current VL's green zone. The reward functions are calculated globally by the centralized critic for each actor and configured using various quality vectors depending on the goal of the scheduling application, including but not limited to the lack of available bins, the packing efficiency of the bins, and the remaining time in the bins after scheduling. The reward functions can be balanced based on the needs of each connected system, subsystem, or customer. The first step is the training of the MADDPG system and requires using multiple input data sets at predetermined points in time (e.g., the beginning of a development program, after major milestone updates, in the event of a failed scheduling attempt, etc.), and small changes to the network definitions that drive a new scheduling operation would utilize the trained network.

Next, the additional steps to implement the neural network for the bin selection for the NST involve first at task 610 to receive a complete set of VLs by the NST which are all the VLs that will or can be scheduled across nodes in the network. Then at task 615, to establish a collection of bin agents that corresponds to the highest rate of time-triggered traffic in the network to determine the initial bin collection size for sending the VL data by the NST. At task 620, the critic function for the agents is configured to evaluate the performance of the neural networks in the agents. Each agent represents a bin of the collection in the network that performs an action, and the critic function evaluates criteria of success for performing the action. The set of VLs is processed (for example by a round-robin approach) to enable the state of the network to be normalized using a normalization algorithm into a set of vectors of bins with state variables for use later in the scheduling. The state variables can also define quality aspects of the collection of VLs for inclusion in the scheduling algorithm. At task 625, one or more reward functions are determined using global quality measurements based on a criterion that includes a lack of available bins, a lack of available VLs, and successfully scheduling operations of a VL into a bin. At task 630, the network is trained based on the normalized state model of the scheduled network by using input data sets at predetermined points in a scheduling timeline. The input data enables the sets of vectors of bins to learn quality aspects to arrive at an optimum bin selection. At task 635, the trained bin agent neural networks are used to perform bin selection and scheduling of a set of input VLs.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method of scheduling a plurality of Virtual Links (VLs) in a Time-Triggered Ethernet (TTE) network, each of the plurality of Virtual Links having a scheduled rate, the method comprising:

determining a weight for each of the plurality of VLs wherein a determined weight being proportional to a demand each of the plurality of VLs will place on the TTE network;

generating a plurality of bins whose length in time is harmonic to all the scheduled rates of the plurality of VLs;

determining, for each of the plurality of bins, a demand value proportional to how often a bin is expected to be used based upon a green zone of each of the plurality of VLs and the determined weight for each of the plurality of VLs wherein the green zone is a time box within a period of scheduling a VL activity based on available latency-related constraints;

updating the demand value for each of the plurality of bins within the green zone of each of the plurality of VLs based upon the weight of each of the plurality of VLs;

sorting the plurality of bins from least demanded to most demanded based upon the updated demand value determined for each of the plurality of bins;

sorting the plurality of VLs based upon a primary sorting requirement and a secondary sorting requirement, the primary sorting requirement comprising a highest schedule rate to a lowest schedule rate and the secondary sorting requirement comprising a smallest green zone to a largest green zone; and scheduling the sorted plurality of VLs within the sorted plurality of bins.

2. The method of claim 1, further comprising:
duplicating bin sets and scheduling traffic for a list of VLs for each rate group in order from fastest to slowest.

3. The method of claim 2, further comprising:
performing calculations of demand values at the beginning of a scheduling process over a duplicate set of global bins which represent an entire schedule cycle using a bin demand property on each bin of a global set.

4. The method of claim 3, further comprising:
processing the list of VLs to determine each VL's weighting factor for updating all of a set of bins within the VL's green zone in order for each bin to the updated demand value by the weighting factor.

5. The method of claim 4, further comprising:
after calculating a global bin demand, processing each VL to determine a median bin demand value of a set of target bins based on the VL's green zone wherein the median bin demand value is added as a sort determination in the list of VLs in order for each VL of the list with a higher median bin demand value in a set of available bins to be scheduled first.

6. The method of claim 5, further comprising:
when a rate transition occurs in the scheduling algorithm, duplicating a list of scheduled bins, and assigning each bin a maximum demand value of all of the harmonic bins of a global bin set.

7. The method of claim 6, further comprising:
when the VL is scheduled in a current bin rate group, the VL's demand value is first removed from a global bin set, and a current bin rate group is then sorted primarily by bin demand value and then by bin utilization.

8. The method of claim 7, further comprising:
when VLs are scheduled into bins, the bin utilization is tracked by the NST in order to re-order the bins for searching and for favoring selection of bins that exhibit the least demand from other VLs thereby searching parts of the global timeline that will satisfy the latency constraints of a current VL, and favor a set of lowest-demand but highest-utilized bins to maximize bin packing efficiency.

9. The method of claim 1 wherein the available latency related constraints comprise: producing and consuming host timing and network latency budget constraints.

10. The method of claim 1, further comprising:
scheduling each VL based on a transmit rate, size, and latency constraint.

11. The method of claim 1, further comprising:
multiplying a VL payload by a period and dividing a result by the green zone size in order to give greater weight to the low-rate and low latency traffic in a list of VLs.

12. A system for scheduling a plurality of Virtual Links (VLs) in a Time-Triggered ethernet network using a network scheduling tool (NST), each of the plurality of VLs having a scheduled rate, the system comprising:
the NST configured to:
determine a weight for each of the plurality of VLs wherein a determined weight is proportional to a demand each of the plurality of VLs will place on the time-triggered Ethernet network;
generate a plurality of bins whose length in time is harmonic to all the scheduled rates of the plurality of VLs;
determine, for each of the plurality of bins, a demand value proportional to how often a bin is expected to be used based upon a green zone of each of the plurality of VLs and the determined weight for each of the plurality of VLs wherein the green zone is a time box within a period of scheduling a VL activity based on available latency-related constraints;
update the demand value for each of the plurality of bins within the green zone of each of the plurality of VLs based upon the weight of each of the plurality of VLs;
sort the plurality of bins from least demanded to most demanded based upon the updated demand value determined for each of the plurality of bins;
sort the plurality of VLs based upon a primary sorting requirement and a secondary sorting requirement, the primary sorting requirement comprising a highest schedule rate to a lowest schedule rate and the secondary sorting requirement comprising a smallest green zone to a largest green zone; and
schedule the sorted plurality of VLs within the sorted plurality of bins.

13. The system of claim 12, the NST further configured to:
duplicate bin sets and schedule traffic for each rate group of VLs in order from fastest to slowest.

14. The system of claim 13, the NST further configured to:
perform calculations of demand values at the beginning of a scheduling process over a duplicate set of global bins which represent an entire schedule cycle for a list of VLs using a bin demand double-precision floating-point property on each bin of a global set.

15. The system of claim 14, the NST further configured to:
process the list of VLs to determine each VL's weighting factor for updating all of a set of bins within the VL's green zone in order for each bin to the updated demand value by the weighting factor.

16. The system of claim 15, the NST further configured to:
after calculating a global bin demand, process each VL to determine a median bin demand value of a set of target bins based on the VL's green zone wherein the median bin demand value is added as a sort determination in the list of VLs in order for each VL of the list with a higher median bin demand value in a set of available bins to be scheduled first.

17. The system of claim 16, the NST further configured to:
when a rate transition occurs in the scheduling algorithm, duplicate a list of scheduled bins, and assign each bin a maximum demand value of all of the harmonic bins of a global bin set.

18. The system of claim 17, the NST further configured to:
when the VL is scheduled in a current bin rate group, remove the VL's demand value from a global bin set, and a current bin rate group is then sorted primarily by bin demand value and then by bin utilization.

19. The system of claim 18, the NST further configured to:
when VLs are scheduled into bins, track the bin utilization is tracked in order to re-order the bins for searching and for favoring selection of bins that exhibit the least demand from other VLs thereby searching parts of the global timeline that will satisfy the latency constraints of a current VL, and favor a set of lowest-demand but highest-utilized bins to maximize bin packing efficiency.

20. An apparatus comprising a network scheduling tool (NST) for scheduling a plurality of Virtual Links (VLs) in a Time-Triggered Ethernet (TTE) network, comprising:

the NST configured with a processor programmed by a set of instructions to schedule time-triggered traffic in a green zone based on timing data available for the VLs, wherein the green zone is a time box within a period of scheduling a VL activity based on available latency-related constraints, by:

determining a weight for each of the plurality of VLs wherein a determined weight is proportional to a demand each of the plurality of VLs will place on the TTE network;

generating a plurality of bins whose length in time is harmonic to all the scheduled rates of the plurality of VLs;

determining, for each of the plurality of bins, a demand value proportional to how often a bin is expected to be used based upon the green zone of each of the plurality of VLs and the determined weight for each of the plurality of VLs;

updating the demand value for each of the plurality of bins within the green zone of each of the plurality of VLs based upon the weight of each of the plurality of VLs;

sorting the plurality of bins from least demanded to most demanded based upon the updated demand value determined for each of the plurality of bins;

sorting the plurality of VLs based upon a primary sorting requirement and a secondary sorting requirement, the primary sorting requirement comprising a highest schedule rate to a lowest schedule rate and the secondary sorting requirement comprising a smallest green zone to a largest green zone; and scheduling the sorted plurality of VLs within the sorted plurality of bins.

* * * * *